(12) United States Patent
Harrod et al.

(10) Patent No.: US 6,755,187 B2
(45) Date of Patent: *Jun. 29, 2004

(54) COOKING GRILL

(75) Inventors: James E. Harrod, Joplin, MO (US); Wesley H. Ogden, Joplin, MO (US)

(73) Assignee: The Great Outdoors Grill Company, Joplin, MO (US)

(*) Notice: Subject to any disclaimer, the term of this patent is extended or adjusted under 35 U.S.C. 154(b) by 249 days.

This patent is subject to a terminal disclaimer.

(21) Appl. No.: 09/996,426

(22) Filed: Nov. 21, 2001

(65) Prior Publication Data

US 2003/0094170 A1 May 22, 2003

(51) Int. Cl.[7] .................................................. A47J 37/00
(52) U.S. Cl. ...................... 126/25 R; 126/41 R; 126/50; 126/40
(58) Field of Search ................. 126/25, 39 R, 126/41 R, 40, 50, 304, 306; 108/150, 161; 297/188.1, 188.09

(56) References Cited

U.S. PATENT DOCUMENTS

| | | | | |
|---|---|---|---|---|
| 1,503,850 A | * | 8/1924 | Rockefeller et al. ........ | 431/161 |
| 3,581,731 A | | 6/1971 | Schultz ........................ | 126/25 |
| 3,630,189 A | * | 12/1971 | Hodges et al. ............. | 126/41 R |
| 3,866,994 A | * | 2/1975 | Bonin ......................... | 312/236 |
| 3,880,097 A | * | 4/1975 | Camilleri .................... | 108/150 |
| 3,915,146 A | * | 10/1975 | Bauer ......................... | 126/41 R |
| 3,938,493 A | * | 2/1976 | Bauer ......................... | 126/41 R |
| 3,964,463 A | * | 6/1976 | Dailey ........................ | 126/41 R |
| 4,062,341 A | * | 12/1977 | Panzarella ................. | 126/41 R |
| 4,321,857 A | * | 3/1982 | Best ............................ | 99/340 |
| 4,524,751 A | | 6/1985 | Hoglund .................... | 126/25 A |
| 4,561,418 A | * | 12/1985 | Cairns ........................ | 126/41 R |
| 4,599,950 A | * | 7/1986 | Evans ......................... | 108/150 |
| 4,643,164 A | * | 2/1987 | LaForge ..................... | 126/44 |
| 4,760,802 A | * | 8/1988 | Leong ..................... | 108/157.16 |
| 5,050,829 A | * | 9/1991 | Sykes ..................... | 248/188.8 |
| 5,086,753 A | * | 2/1992 | Berger ...................... | 126/41 R |
| 5,154,158 A | | 10/1992 | Lindsey ...................... | 126/9 R |
| 5,186,159 A | * | 2/1993 | Crow et al. ............... | 126/41 R |
| 5,333,596 A | * | 8/1994 | Clifford .................... | 126/41 R |
| 5,513,623 A | * | 5/1996 | Hong ......................... | 126/38 |
| 5,738,084 A | * | 4/1998 | Hussong .................... | 126/512 |
| 5,813,394 A | * | 9/1998 | Clifford .................... | 126/41 R |
| 6,024,082 A | | 2/2000 | Straubel et al. ........... | 126/41 R |
| 6,119,679 A | * | 9/2000 | Galvin ....................... | 126/41 R |
| 6,142,143 A | * | 11/2000 | Martin ...................... | 126/506 |
| 6,199,549 B1 | | 3/2001 | Yerkes ...................... | 126/276 |
| 6,254,160 B1 | * | 7/2001 | Marriott et al. ............ | 296/24.1 |
| 6,276,356 B1 | * | 8/2001 | Ragland et al. ........... | 126/41 R |

FOREIGN PATENT DOCUMENTS

JP 406098832 * 4/1994 ............... 126/41 R

* cited by examiner

*Primary Examiner*—Carl D. Price
(74) *Attorney, Agent, or Firm*—Martin & Associates, LLC; Derek P. Martin

(57) ABSTRACT

A portable grill having a rectangular structural foam base and a structural foam pillar defining the outside of the grill. A metal collar is mounted on the pillar with a ceramic insulating gasket and a metal heat shield in contact with the gasket and collar. Aluminum bottom and top shells enclose the burner. At least one shelf bracket is on the bottom shell with a structural foam side table mounted thereon. The preferred foamed polymer has a flexural modulus of over 150,000 psi and a hardness of over 80 Rockwell Hardness R. The pillar and base have ribs aligned to resist bending or flexing. The preferred gasket is formed from ceramic material capable of resisting a temperature of at least 1800° F. during continuous use. The grill can operate at full combustion for at least eight hours for at least six consecutive days.

19 Claims, 8 Drawing Sheets

COOKING GRILL

FEILD OF THE INVENTION

The present invention relates to a cooking grill. More particularly the invention relates to a cooking grill using structural foam plastic as one component of its construction. A ceramic gasket is used along with steel heat shields to protect portions of the polymer closest to the heat.

BACKGROUND OF THE INVENTION

Outdoor cooking is a long established summer pastime in the United States, beginning with camp fires to outdoor fireplaces, and finally to portable outdoor grills. A wide variety of designs has been manufactured, from stone, brick, concrete, aluminum, stainless steel and other metals, and, in some limited cases from synthetic materials. Each of these materials have drawbacks as well as good features. Those materials such as concrete are too heavy. Aluminum and most metals are not always strong enough to resist flexing, so that collapsing or tipping over may happen when heavy plates of meats such as chicken, ribs or steaks are placed on one or more of the shelves provided. Any material used in manufacturing an outdoor grill must be resistant to heat Schultz U.S. Pat. No. 3,581,731 discloses a portable cooking unit that uses an insulated chest to make carrying the unit easier or safer. The chest is formed from expanded plastic foam Hoglund U.S. Pat. No. 4,524,751 is another portable cooking device that has plastic material used in areas where bending stress or heat are minimized. Lindsey U.S. Pat. No. 5,154,158 combines a cooler and grill and the cover is stated to be made from or molded of plastic. It is clear that any plastic will function as well as any other material since it does not have to be load bearing and it is not near the burner.

Straubel et al. U.S. Pat. No. 6,024,082 is an outdoor cooking device in which the support housing is made from a non-metal material which is molded into a hollow thin walled structure. The non-metal material may be concrete or cement, sand and fibers. This patent describes a hollow support structure and other components made from glass fiber reinforced concrete. This is, of course, a heavy material that may, if improperly loaded, have an imbalance that may lead to safety concerns.

Yerkes U.S. Pat. No. 6,199,549 shows a larger device made from non-metal materials, in this case from aluminosilicate compositions.

It would be of great advantage in the art if an improved outdoor grill could be manufactured that would have complete heat resistance, compressive and bending strength to provide a safe grill for use in backyard environments.

It would be another great advance in the art if the grill would be low enough in cost and light enough in weight to allow almost all consumers to acquire it.

Other advantages will appear hereinafter.

SUMMARY OF THE INVENTION

It has now been discovered that the above and other objects of the present invention may be accomplished in the following manner. Specifically, the present invention provides a portable grill having a source of fuel and at least one burner.

The grill is formed from a structural foam polymer base and pillar, such that the base and pillar both have a plurality of ribs for resisting torsion when weight is placed on the grill or if the grill is moved to a new location. It is intended that the base include wheels or rollers to facilitate movement In a preferred embodiment, the pillar has a center portion defining the front of the grill and two side portions defining opposing side ends of the grill so that the back of the grill is open for connection to a fuel source such as a propane bottle and the like.

Both the base and the pillar are made from a structural foam polymer, such as foamed polypropylene. In any case, the polymer should have a flexural modulus of at least 150,000 psi and preferably over 200,000 psi. It should have a hardness of at least 80 on the Rockwell Hardness R scale. A preferred minimum Rockwell Hardness R value is at least 100.

Also forming part of the grill is a metal pillar collar mounted on the top end of the pillar, for holding the remaining parts. On top of the collar is placed a ceramic insulating gasket. The gasket is preferably formed from ceramic material capable of resisting a temperature of at least 1800° F. during continuous use. Other heat resistant gaskets may also be used. The gasket functions to keep the temperature of the pillar below any temperature at which it would soften.

A metal heat shield having an upper lip in contact with the gasket is supported by the collar. The shield preferably has a tapered front, tapered sides and a flat bottom for reflection of heat in a direction toward the at least one burner and away from the lower portions of the complete grill.

The grill also includes a bottom shell, preferably made from cast aluminum although steel cast iron and other materials are suitable, that is supported on the collar and encloses the heat shield. Pivotally mounted on the bottom shell is a top shell having a handle to permit opening of the top shell. The preferred material for the top shell is also made from cast aluminum, though other metals are suitable as well.

For convenience of use, the grill should have at least one structural foam side table mounted on the bottom shell. The preferred side table uses the same structural foam as is used for the base and pillar.

The construction of the grill pillar provides substantial strength with only three sides of rigid structural foam polymer and one open side. This permits easy access to the fuel tank and allows the unit to be cleaned. For safety sake, a retaining wire is used to prevent the tank from falling out of the grill if it should be moved at an incline, such as up stairs.

The grill of this invention has been found to be capable of operating at full combustion capacity for at least eight hours a day for at least six consecutive days. The grill is stable and able to hold the weight of heavy objects, for example large platters of meat, without twisting or bending. The present invention meets all requirements of the AGA and CSA testing standards for barbeque safety.

Because of the positioning of a ceramic gasket and metal heat shield, not only is the grill safe, it is durable and can withstand many seasons of operation without deterioration.

BRIEF DESCRIPTION OF THE DRAWINGS

For a more complete understanding of the invention, reference is hereby made to the drawings, in which.

DETAILED DESCRIPTION OF THE PREFERRED EMBODIMENT

The portable grill of this invention is to be used with a source of fuel and at least one burner. The invention comprises an improved construction having superior strength properties and durability.

Figure 1:
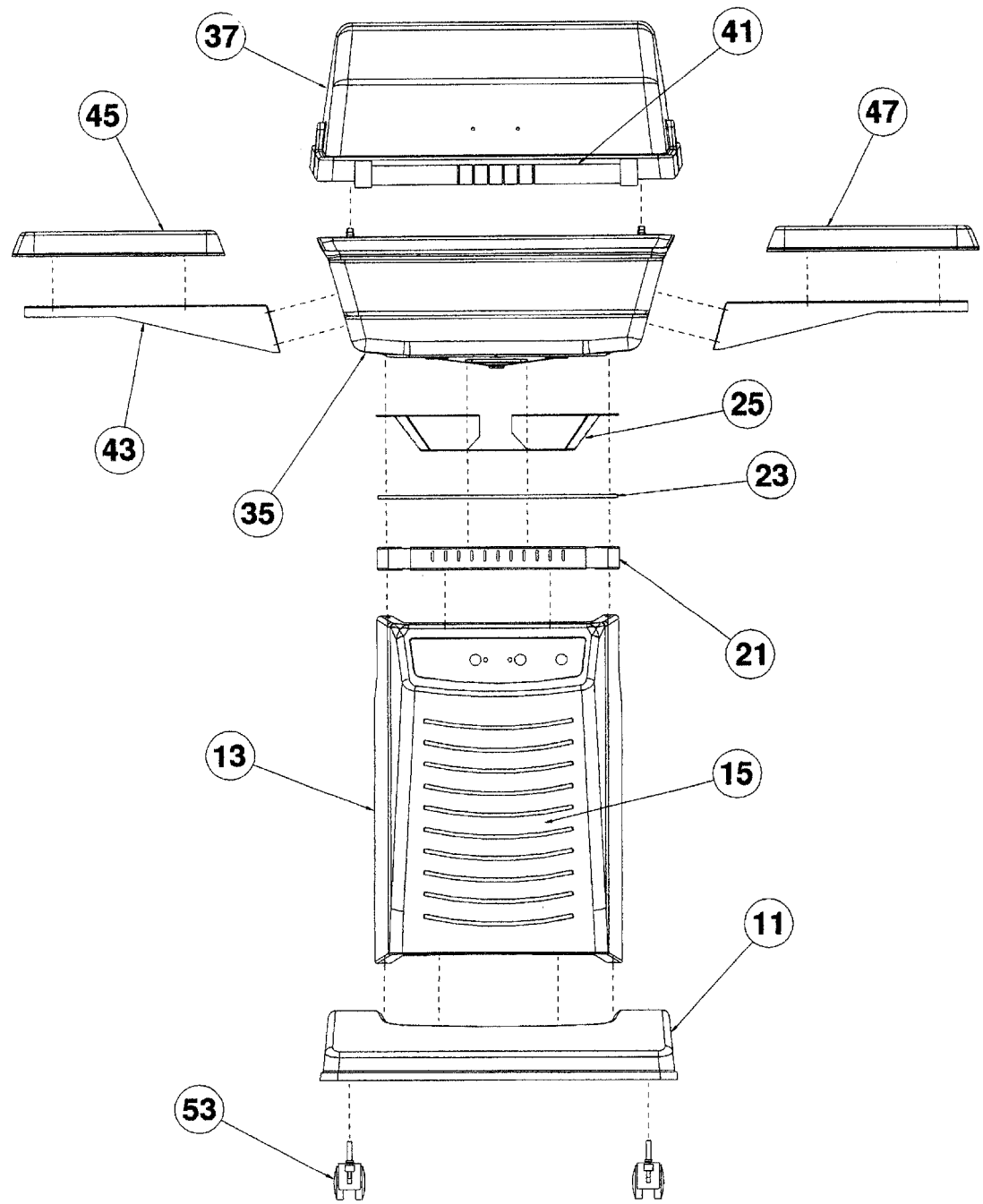
FIG. 1 is an exploded, perspective, front view of the preferred embodiment of this invention.
Figure 2:
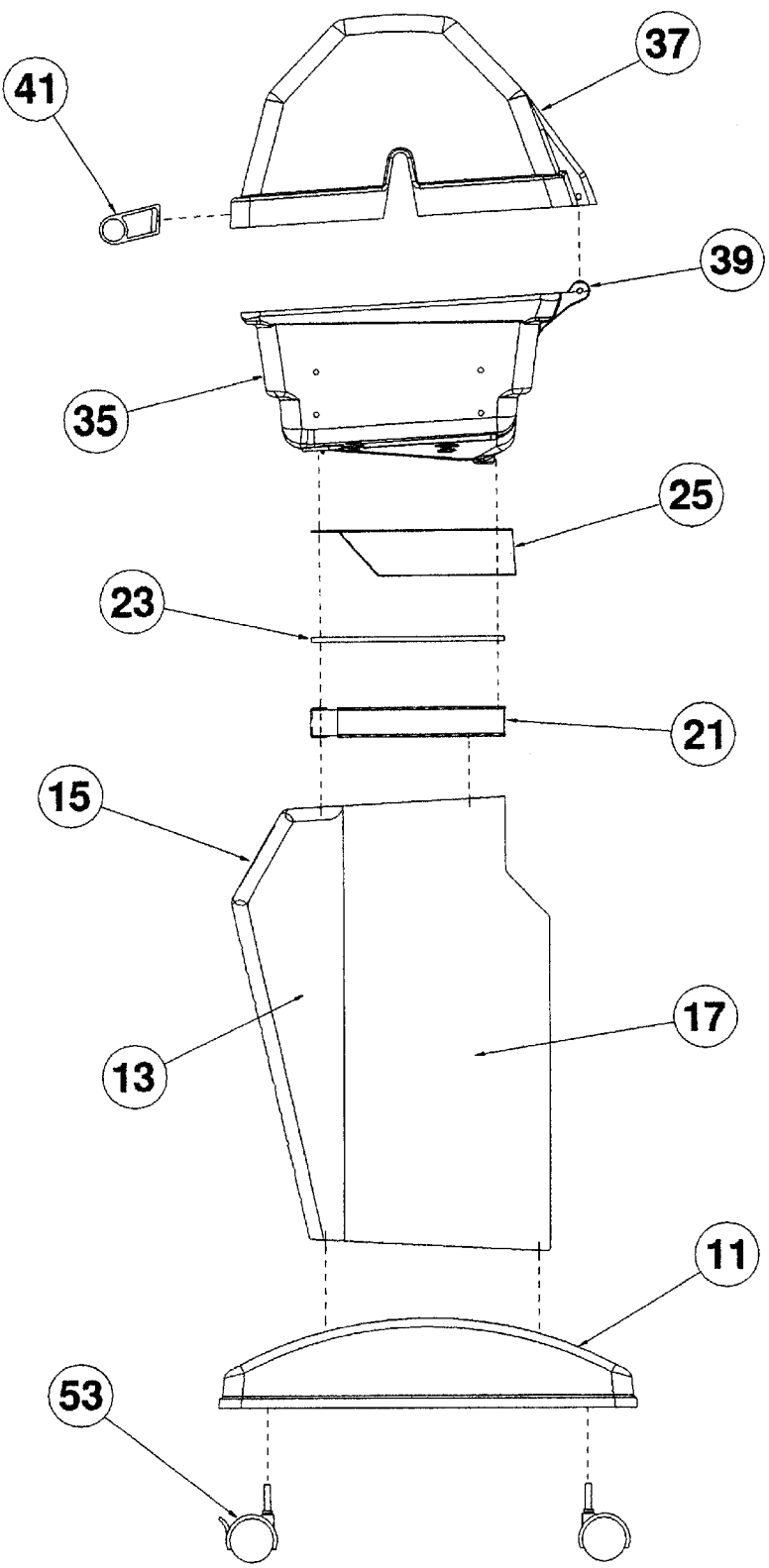
FIG. 2 is an exploded, perspective, side view of the preferred embodiment of this invention.

As shown in the drawings, the device, 10 generally, in FIGS. 1 and 2, includes a rectangular structural foam base 11 and a hollow structural foam pillar 13 mounted on base 11. In FIGS. 1 and 2, a dash line indicates where the parts come together and where fasteners are used.

Figure 4:
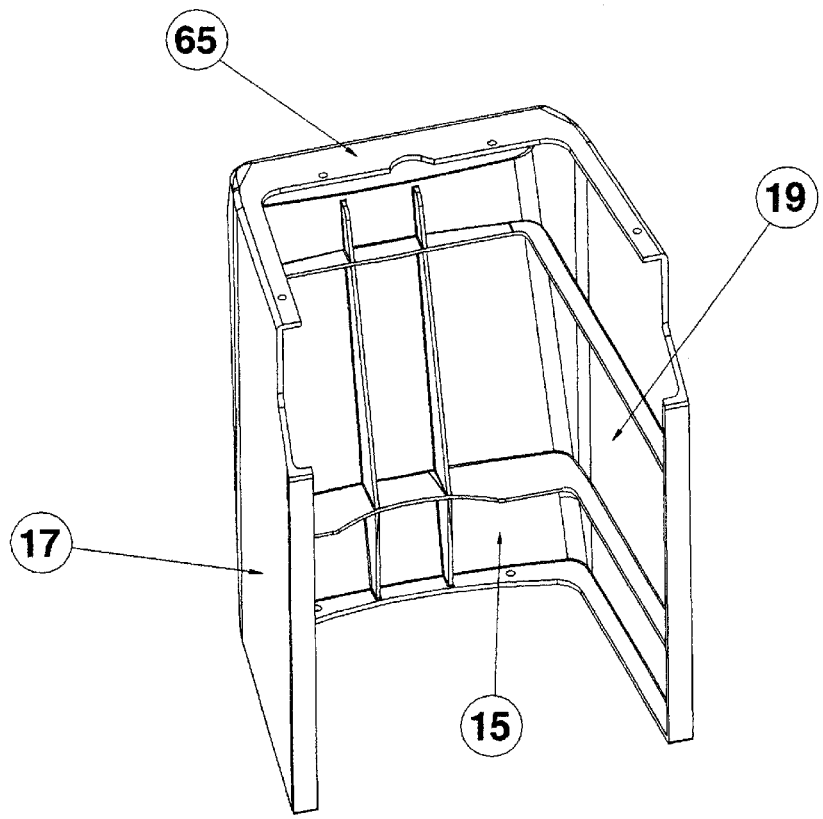
FIG. 4 is a perspective view of the pillar shown in FIGS. 1 and 2.
Figure 5:
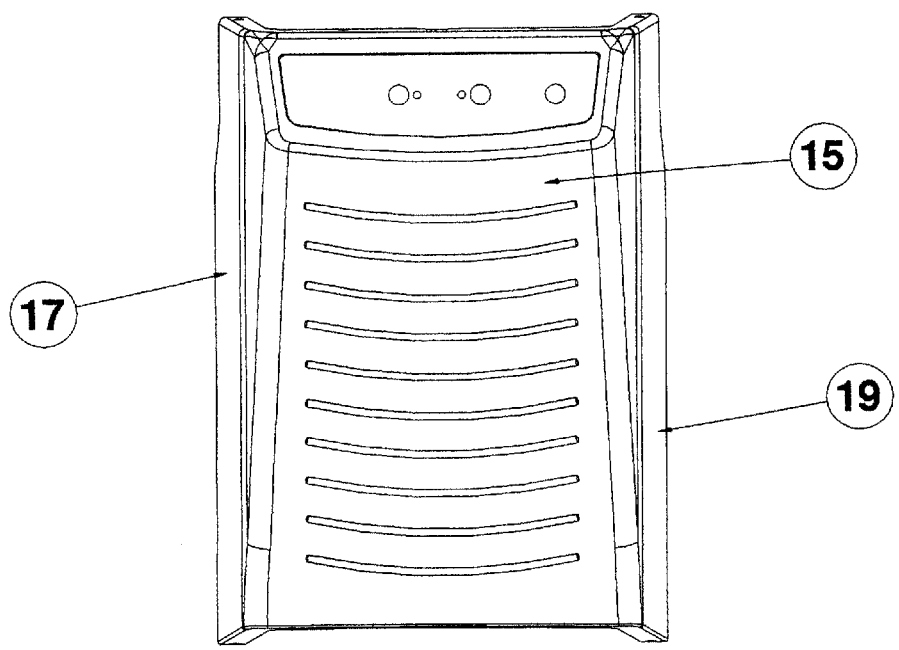
FIG. 5 is a front view of the pillar shown in FIG. 4.
Figure 6:
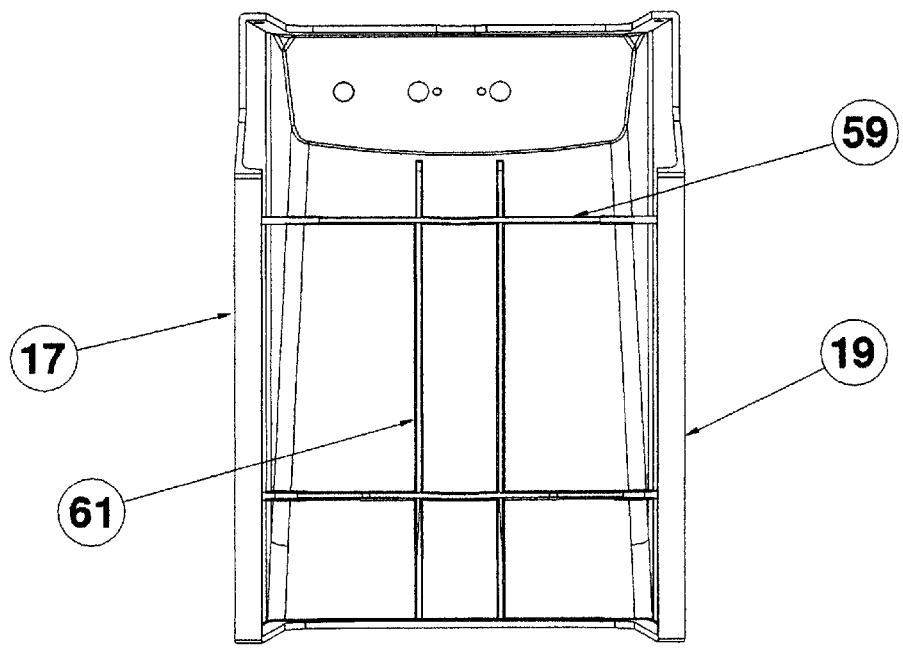
FIG. 6 is a back view of the pillar shown in FIG. 4.
Figure 7:
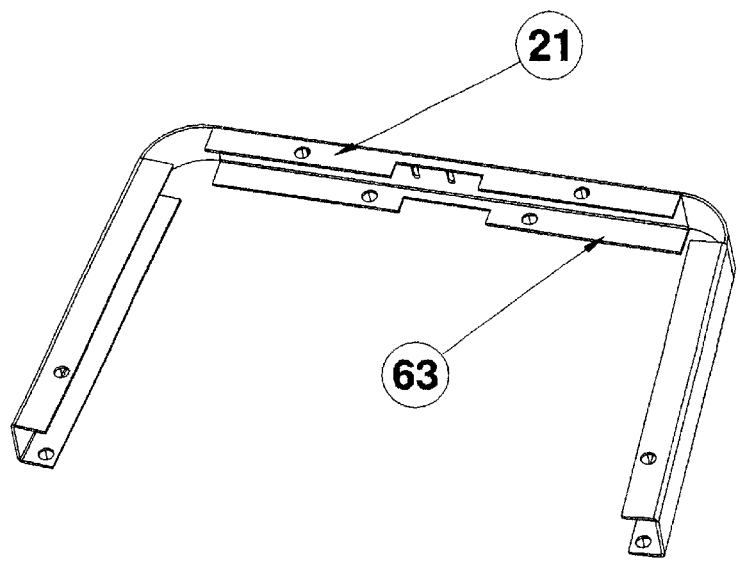
FIG. 7 is a perspective view of the pillar collar shown in FIGS. 1 and 2.
Figure 8:
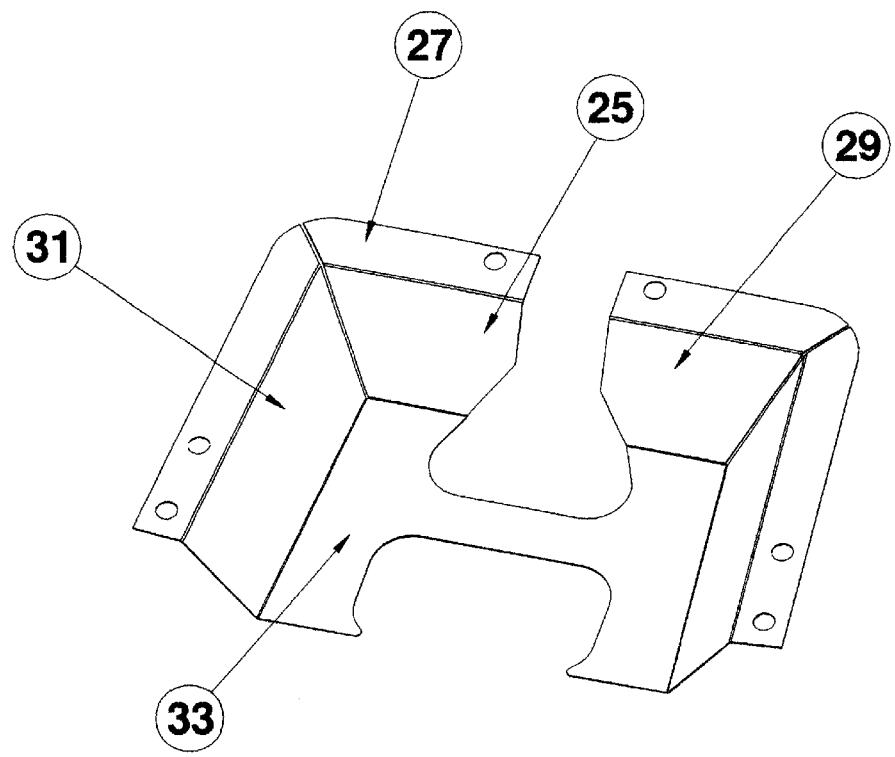
FIG. 8 is a perspective view of the heat shield shown in FIGS. 1 and 2.

As seen in FIG. 4, the back or inside view of pillar 13 includes a center portion 15 defining the front of the grill and two side portions 17 and 19 respectively, defining opposing side ends of the grill. Pillar 13 has an open back portion. FIGS. 5 and 6 illustrate the front portion 15 with holes for control elements to control the burner and gas flow as is conventional FIG. 7 shows the metal pillar collar 21 for mounting on the other end of the pillar 13, on to which is fit a ceramic insulating gasket 23 sized to fit in the collar 21, on top of which is a metal heat shield 25 having an upper lip 27 in contact with the gasket 23 for support by collar 21. Heat shield 25 includes a tapered front 29, tapered sides 31 and a flat bottom 33 for reflection of heat in a direction toward the burners.

A bottom shell 35 is supported on collar 21 for enclosing the heat shield 25 and a top shell 37 is pivotally mounted on the bottom shell via hinges 39, shown in FIG. 2, for example. Top shell 37 includes handle 41 to permit opening of the top shell when the grill is in use. Cast aluminum is preferred but other metals are also suitable.

Figure 9A:
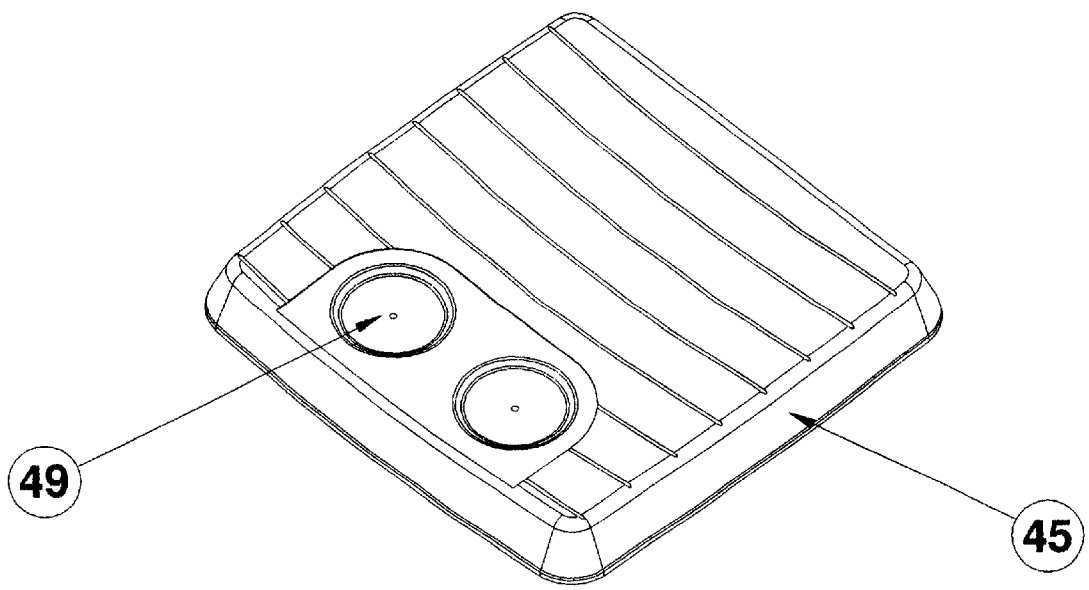
FIGS. 9a and 9b are perspective views of a side tray shown in FIGS. 1 and 2.
Figure 9B:
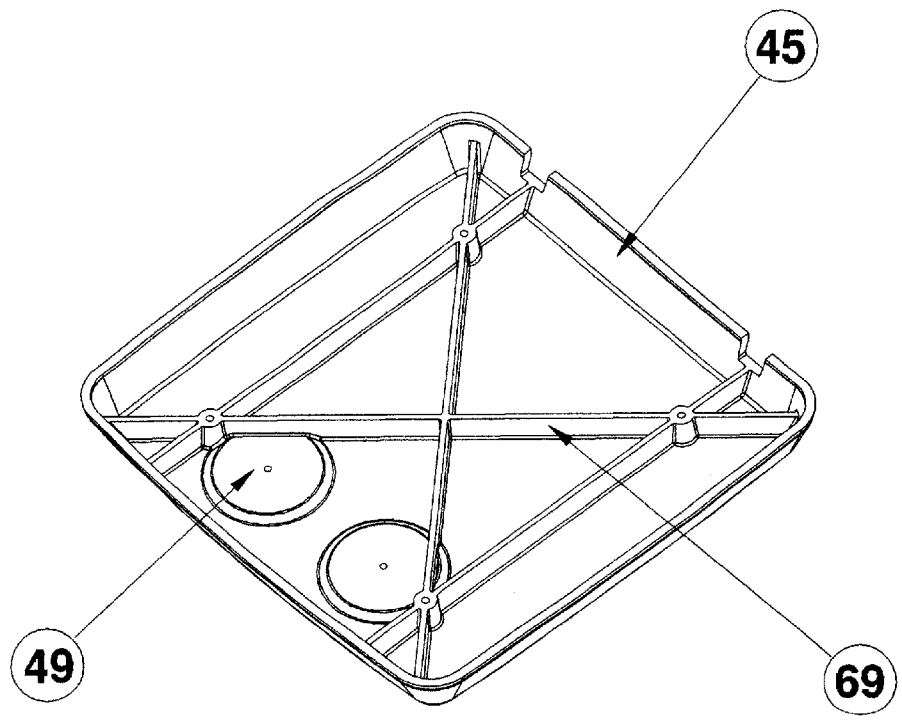
Figure 10A:
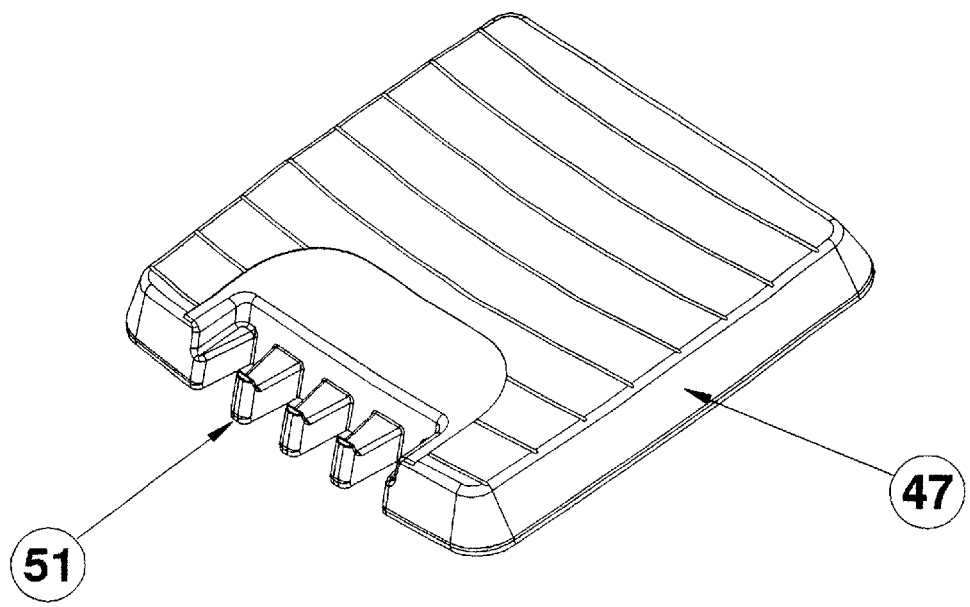
FIGS. 10a and 10b are perspective views of an alternative side tray shown in FIGS. 1 and 2.
Figure 10B:
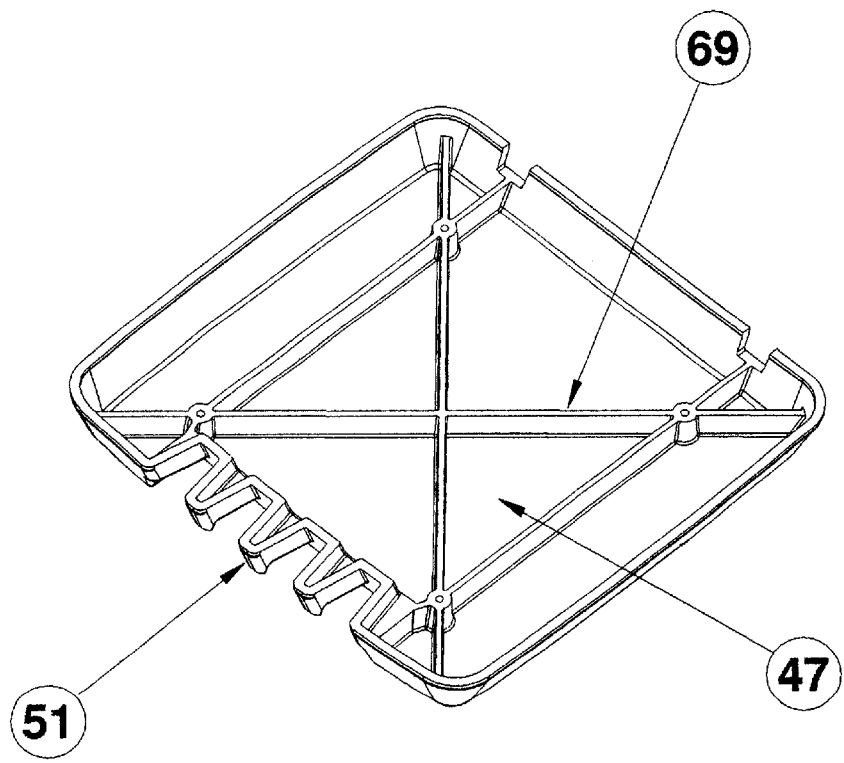

The device includes at least one shelf bracket 43 extending out from an end of the bottom shell 35 to support at least one structural foam side table 45. In the preferred embodiment, a pair of shelf brackets are used on each side. FIGS. 9a and 9b illustrate the top and bottom of one side table 45, while FIGS. 10a and 10b illustrate a second version of the molded foam side table 47. Shelf 45 has cup holders 49 formed therein and shelf 47 includes a plurality of spaced utensil holders 51.

Figure 3:
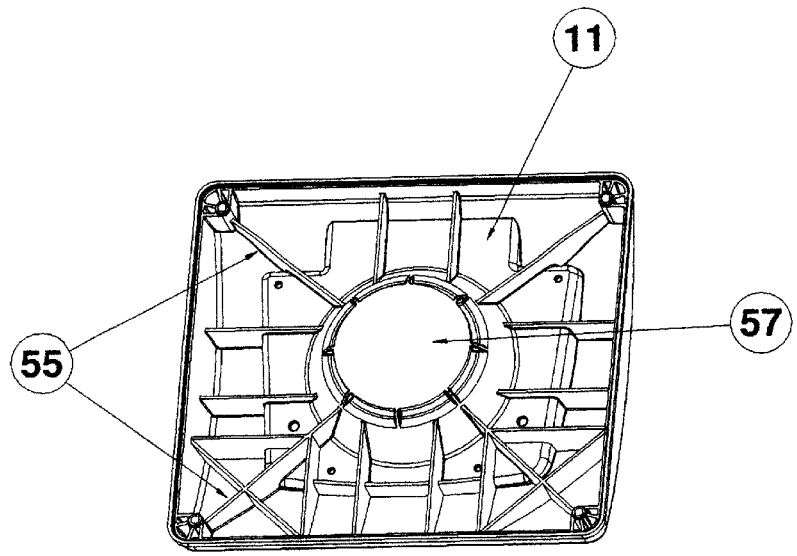
FIG. 3 is a perspective view of the base shown in FIGS. 1 and 2.

Base 11 includes casters 53 to permit movement of the grill to specific locations of choice. Because base 11 and pillar 13 are made from structural foam polymer, there is essentially no measurable torsion when the completed grill is moved, thus reducing significantly the danger or inconvenience of a spill of anything carried on the shelves. Base 11 also has a plurality of ribs 55, seen in FIG. 3 as extending radially from the outer edge to a central collar member 57. Since the polymer has a flexural modulus of at least 150,000 psi and preferably over 200,000 psi, a stable yet portable grill has been produced for the first time. Even metals don't have this resistance to flex in thicknesses that could be economically and practically used.

As can be seen in FIG. 6, for example, pillar 13 also includes a plurality of ribs 59 and 61 in both the horizontal direction from side 17 to side 19, and in the vertical direction from top to bottom of front or center 15. These ribs 59 and 61 form an interlocking rib design that gives structural integrity to the pillar 13 and thus the entire grill. Since the pillar 13 has an open side, it is particularly desirable to have the high flexural modulus of structural foam polymers as described herein. Since pillar 13 is fixedly mounted to base 11, the combination of base 11 and pillar 13, with ribs 55, 59 and 61, provides the strongest grill possible while still permitting pillar 13 to have an open back. Prior art grills do not compare in strength to the grill of this invention and, thus, need to have four sides in an attempt to provide some stability. That fourth side hinders the insertion and removal of the fuel tank, for example, and reduces the ability to keep the grill clean and presentable.

The metal collar 21, shown in FIG. 7, is formed with a channel 63 that fits on the top 65 of pillar 13, shown in FIG. 4. Fasteners are used to ensure a permanent assembly. Ceramic insulating gasket 23 fits on the collar 21, over which is placed upper lip 27 of heat shield 25. Thus the heat encountered by heat shield 25 is insulated from collar 21, thus reducing the temperature of the top of pillar 13. When the grill is operated at full capacity, the temperature of the pillar 13 does not reach anywhere near the temperature that would adversely affect its structural integrity.

The two forms of side trays 45 and 47, shown respectively in FIGS. 9b 10b, also include ribs 69, preferably extending diagonally to provide additional strength and resistance to torsion, making the grill very safe.

Figures 11, 12A, 12B:
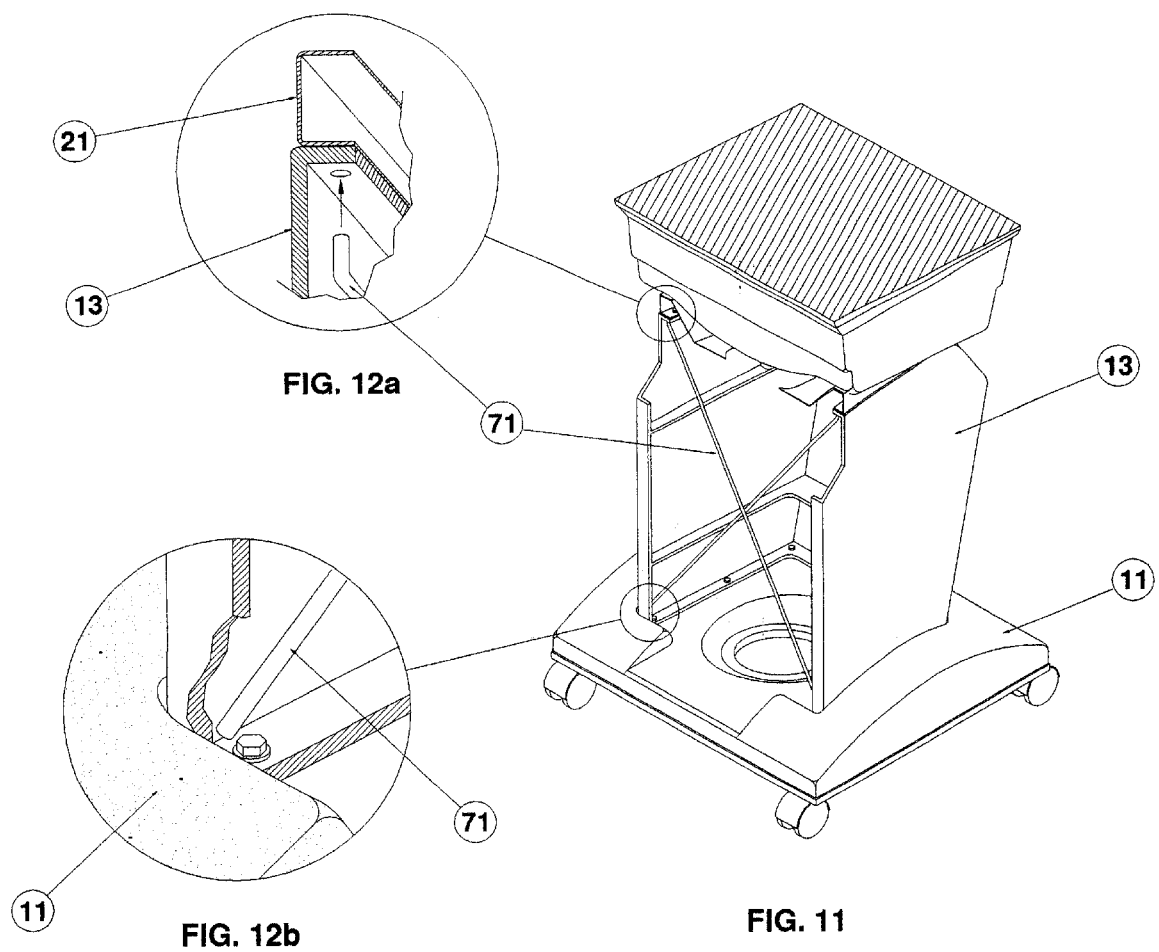
FIG. 11 is a perspective view of a retainer wire installed in a partially completed device as shown in FIGS. 1 and 2.
FIGS. 12a and 12b are detail views of the retainer wire attachments to the base shown in FIG. 4.

FIG. 11 illustrates the use of a retainer wire 71 to keep the fuel tank, not shown but sized to fit in collar member 57 of base 11, retained inside pillar 13. Because the grill is so strong and can be moved with great ease, the retainer wire 71 is an additional safety feature to prevent the tank from falling out even when the grill is tipped, such as when being moved up or down stairs or from one level of a deck to another.

The preferred structural foam polymer are foamed polypropylene homopolymer, foamed polyethylene homopolymers and copolymers of these homopolymers, all having good strength and resistance to bending.

The polymer should have a flexural modulus of at least 150,000 psi and preferably over 200,000 psi. It should have a hardness of at least 80 on the Rockwell Hardness R scale. A preferred minimum Rockwell Hardness R value is at least 100.

One such polymer is a structural foam polymer formed from Bapolene® Grade 4026 polypropylene homopolymer, which has a flexural Modulus of 200,000 psi, when tested using ASTM test D-790. It has a hardness on the Rockwell Hardness R scale of 100, using ASTM test D-785.

Bapolene® Grade 4026 is available from Bamberger Polymers, Inc. Another preferred polypropylene for use as the structural foam polymer is Huntsman PP P4G4B-036, manufactured by Huntsman Polymer Corporation. Huntsman PP P4G4B-036 has a flexural Modulus of 231,000 psi and a Rockwell Hardness on the R scale of 108. Both are examples of polymers that can be made into the structural foam components of the present invention.

The ceramic insulating gasket of the present invention is preferably formed from ceramic material capable of resisting a temperature of at least 1800° F. during continuous use. One such gasket material is formed from a woven ceramic having the appearance of paper and including a binder sufficient to create adequate stiffness. Superwool® 607 paper form ceramics has a nominal density of 10 to 13 pcf and is used in thicknesses of about 0.25 inches. It is rated for continuous use at up to 1832° F. and a maximum use limit of 2012° F. Its melting point is 2327 F. Superwool® 607 is formed from 60–70% silica, 25–35% calcium oxide and 4-7% magnesium oxide.

The present invention was able to pass, without difficulty, an industry standard test where the grill was operated at maximum burning rate for eight hours a day for six consecutive days without damage. It has also passed all industry standard tests for safety. Additionally, various loads of meats, liquids and other conventional barbecue foods are safely and completely supported on the tables.

While particular embodiments of the present invention have been illustrated and described, it is not intended to limit the invention, except as defined by the following claims.

What is claimed is:

1. A portable grill comprising:
   a base;
   a substantially hollow structural foam pillar having a bottom end mounted on said base and having a center portion defining the front of said grill and two side portions defining opposing side ends of said grill;
   a metal pillar collar mounted on a top end of said pillar;
   a thermally insulating gasket sized to fit on said collar;
   a metal heat shield having an upper lip in contact with said gasket for support by said collar, said shield having a tapered front, tapered sides and a flat bottom for reflection of heat in a direction away from the top end of said pillar; and
   a bottom shell supported on said collar and in contact with the metal heat shield.

2. The grill of claim 1, wherein said structural foam is formed from a foamed polymer having a flexural modulus of at least 150,000 psi and a hardness of at least 80 on the Rockwell Hardness R scale.

3. The grill of claim 2, wherein said polymer is polypropylene having a flexural modulus of at least 200,000 psi and a hardness of at least 100 on the Rockwell Hardness R scale.

4. The grill of claim 1, wherein said pillar has support ribs aligned vertically and horizontally to resist bending of said pillar when weight is applied to said grill.

5. The grill of claim 1, wherein said base comprises structural foam with a plurality of ribs on the underside thereof for resisting torsion when weight is placed on said grill.

6. The grill of claim 1, wherein said gasket is formed from ceramic material capable of resisting a temperature of at least 1800°F. during continuous use.

7. The grill of claim 1, wherein said grill is capable of operating at full combustion capacity for at least eight hours for at least six consecutive days.

8. A portable grill comprising:
   a structural foam base, said base having a plurality of ribs on the underside thereof for resisting torsion when weight is placed on said grill;
   a substantially hollow structural foam pillar having a bottom end mounted on said base and having a center portion defining the front of the said grill and two side portions defining opposing side ends of said grill, said pillar having support ribs aligned vertically and horizontally to resist bending of said pillar when weight is placed on said grill;
   a metal pillar collar mounted on a top end of said pillar;
   a thermally insulating gasket sized to fit on said collar;
   a metal heat shield having an upper lip in contact with said gasket for support by said collar, said shield having a tapered front, tapered sides and a flat bottom for reflection of heat in a direction away from the top end of said pillar;
   a bottom shell supported on said collar and in contact with the metal heat shield;
   said structural foam for said base and pillar being formed from a foamed polymer having a flexural modulus of at least 150,000 psi and a hardness of at least 80 on the Rockwell Hardness R scale.

9. The grill of claim 8, wherein said polymer is polypropylene having a flexural modulus of at least 200,000 psi and a hardness of at least 100 on the Rockwell Hardness R scale.

10. The grill of claim 8, wherein said gasket is formed from ceramic material capable of resisting a temperature of at least 1800° F. during continuous use.

11. The grill of claim 8, wherein said grill is capable of operating at full combustion capacity for at least eight hours for at least six consecutive days.

12. The grill of claim 8 further comprising:
    at least one shelf bracket extending from the bottom shell; and
    at least one structural foam side table mounted on the shelf bracket.

13. The grill of claim 8 further comprising a top shell pivotally mounted on the bottom shell, the top shell having a handle to permit opening of the top shell.

14. A portable grill comprising:
    a rectangular structural foam base, said base having a plurality of ribs on the underside thereof for resisting torsion when weight is placed on said grill;
    a structural foam pillar having a bottom end mounted on said base and having a center portion defining the front of said grill and two side portions defining opposing side ends of said grill, said pillar having support ribs aligned vertically to resist bending of said pillar when weight is placed on said grill;
    a metal pillar collar mounted on a top end of said pillar;
    a ceramic insulating gasket sized to fit on said collar;
    a metal heat shield having an upper lip in contact with said gasket for support by said collar, said shield having a tapered front, tapered sides and a flat bottom for reflection of heat in a direction away from the top end of said pillar;
    a bottom shell supported on said collar and in contact with the metal heat shield;
    a top shell pivotally mounted on said bottom shell, said top shell having a handle to permit opening of said top shell; and
    at least one structural foam side table mounted on said bottom shell;
    said structural foam for said base, pillar and side table being formed from a foamed polymer having a flexural modulus of at least 150,000 psi and a hardness of at least 80 on the Rockwell Hardness R scale.

15. The grill of claim wherein said polymer is polypropylene having a flexural modulus of at least 200,000 psi and a hardness of at least 100 on the Rockwell Hardness R scale.

16. The grill of claim 14, wherein said gasket is formed from ceramic material capable of resisting a temperature of at least 1800° F. during continuous use.

17. The grill of claim 16, wherein said grill is capable of operating at full combustion capacity for at least eight hours for at least six consecutive days.

18. The grill of claim 1 further comprising:
   at least one shelf bracket extending from the bottom shell; and
   at least one structural foam side table mounted on the shelf bracket.

19. The grill of claim 1 further comprising a top shell pivotally mounted on the bottom shell, the top shell having a handle to permit opening of the top shell.

* * * * *